United States Patent
Noble, Jr. et al.

(10) Patent No.: US 9,319,525 B1
(45) Date of Patent: Apr. 19, 2016

(54) BEST TIME TO CALL PARTIES HAVING MULTIPLE CONTACTS

(71) Applicant: Noble Systems Corporation, Atlanta, GA (US)

(72) Inventors: James K. Noble, Jr., Marietta, GA (US); Christopher S. Haggerty, Atlanta, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 45 days.

(21) Appl. No.: 14/311,432

(22) Filed: Jun. 23, 2014

(51) Int. Cl.
H04M 3/00 (2006.01)
H04M 5/00 (2006.01)
H04M 3/51 (2006.01)

(52) U.S. Cl.
CPC .......... *H04M 3/5183* (2013.01); *H04M 3/5158* (2013.01); *H04M 3/5191* (2013.01)

(58) Field of Classification Search
CPC ..................................................... G06Q 10/10
USPC ..................................................... 379/265.09
See application file for complete search history.

(56) References Cited

U.S. PATENT DOCUMENTS

| 5,802,161 | A | 9/1998 | Svoronos et al. |
| 7,805,395 | B2 | 9/2010 | Howard et al. |
| 2012/0158412 | A1* | 6/2012 | Dorai et al. ................... 705/1.1 |
| 2013/0060587 | A1* | 3/2013 | Bayrak et al. ................ 705/7.11 |
| 2013/0329880 | A1 | 12/2013 | Bentley et al. |
| 2015/0003602 | A1* | 1/2015 | Bulbul et al. ............ 379/265.09 |

OTHER PUBLICATIONS

CallTech 3.3 Administrator Guide, Dec. 17, 2012, 84 Pages.
CallTech 3.3 Population Manager Guide, Dec. 17, 2012, 46 Pages.

* cited by examiner

Primary Examiner — Nafiz E Hoque

(57) ABSTRACT

Technologies are disclosed for determining a best time to contact a party over a plurality of contact periods of time to achieve at least one of a desired outcome and a desired result. In various embodiments, the party has multiple contact types that can be utilized to contact the party. Accordingly, an optimal contact type for the party for each contact period is selected that identifies the contact type with a probability having the highest likelihood of achieving at least one of the desired outcome and the desired result by utilizing the contact type to contact the party during the contact period. A best time to contact the party is then identified as one of the contact periods based on the optimal contact types selected for the party for each contact period and associated probabilities.

16 Claims, 7 Drawing Sheets

| Account | P-to-P | Contact | Contact Type | 9:00 AM... |  |  | ...11:00 AM... |  |  | ...3:00 PM... |  |  | ...6:00 PM |  |  |
|---|---|---|---|---|---|---|---|---|---|---|---|---|---|---|---|
|  |  |  |  | RPC | WPC | NC | RPC | WPC | NC | RPC | WPC | NC | RPC | WPC | NC |
| A | 0.43 | Home | Wireline | 0.23 | 0.13 | 0.64 | 0.13 | 0.22 | 0.65 | 0.11 | 0.32 | 0.57 | 0.64 | 0.32 | 0.04 |
|  |  | Work | Wireline | 0.44 | 0.32 | 0.24 | 0.47 | 0.12 | 0.41 | 0.47 | 0.21 | 0.47 | 0.22 | 0.31 | 0.47 |
|  |  | Cell | Wireless | 0.67 | 0.01 | 0.32 | 0.77 | 0.01 | 0.13 | 0.42 | 0.00 | 0.43 | 0.43 | 0.00 | 0.57 |

FIG. 5

BEST TIME TO CALL PARTIES HAVING MULTIPLE CONTACTS

BACKGROUND

Whether an organization is selling a product or service or is collecting past due payments, a major challenge that is encountered on a daily basis is simply contacting parties (e.g., customers) for these purposes. This is especially true in light of the limited resources and opportunities many of these organizations face in attempting to contact parties (e.g., accounts). For instance, a contact center typically has only a set number of agents available at any given time to field outbound calls made to accounts as well as a set amount of capacity to place such calls. In addition, a contact center may be limited with respect to the number of attempts the center can make at trying to contact a particular account. For example, many contact centers face regulations that have been put into place limiting the number of attempts these centers can make during a time period to contact a particular account (e.g., individual) for collection purposes.

Furthermore, organizations are not only faced with trying to contact parties, but they are also faced with trying to contact these parties at the right time. For instance, a contact center may place a call to an account and reach them on the phone however the person on the phone may be too busy to talk at that time. Therefore, although the contact center was successful in reaching the person associated with the account, the end result was unsuccessful because the center was unable to conduct any business with respect to the reason the center was contacting the account in the first place.

Lastly, organizations are also faced with having to determine what form or channel of communication should be utilized when trying to contact parties. In today's world, most parties have more than one channel of communication that can be used to reach them. For instance, with respect to placing a phone call to an individual, the individual may have a home landline/wireline phone, a work landline/wireline phone, and a cell phone. At any particular instance, one of these phones may be a better channel to reach the particular individual than the other two phones. For example, a contact center may attempt to contact an individual at 9:00 a.m. on a Tuesday when the individual is normally at work. Therefore, the contact center may have a better chance of success at contacting the individual if the center places a call to the individual's work phone as opposed to the individual's home phone.

Accordingly, organizations faced with having to contact parties to conduct some type of business with these parties are often concerned with the best time to call these parties. A best time to call is considered the right time to call the right party and get the right outcome and/or result. This also holds true in instances involving other forms of communication such as, for example, text messaging and/or emailing parties. Therefore, a need exists in the art for better identifying the best time to contact a party, especially in instances in which the party has multiple channels of communication. It is with regard to this and other aspects that the present disclosure is presented.

BRIEF SUMMARY

Technologies are generally presented herein pertaining to determining a best time to contact a party over a plurality of contact periods of time to achieve at least one of a desired outcome and a desired result. For example, the best time to contact the party may be regarded as a best time to place an outbound call to the party to achieve at least one of having a desired outcome of the party actually answer the call without the call being diverted to voice mail and/or a desired result of obtaining a promise-to-pay on a delinquent payment from the party once he or she has answered the call. While in another example, the best time to contact the party may be regarded as a best time to send an email to the party to achieve at least one of a desired outcome of having the party read the email and/or a desired result of receiving a response back from the party to the email with a request for more information.

In specific instances, the party has a plurality of contact types that can be utilized to contact the party. For example, the party may have a home phone, a work phone, and a cell phone comprising landline/wireline and wireless devices that may be called to attempt to contact the party during any of the plurality of contact periods. Further the contact periods of time can encompass different segments of time such as, for example, consecutive one hour segments of time beginning at 8:00 a.m. and ending at 8:00 p.m.

In various embodiments, probabilities of achieving at least one of the desired outcome and the desired result are generated with respect to the party that include a set of probabilities for each of the contact periods of time. For instance, in particular embodiments, a set of probabilities for a particular contact period of time for the party comprises a probability for each contact type for the party of achieving at least one of the desired outcome and the desired result by utilizing the contact type to contact the party during the particular contact period of time.

Once the set of probabilities have been generated for the party and contact periods of time, an optimal contact type for the party for each of the contact periods of time is selected in various embodiments. For these embodiments, the optimal contact type for a particular contact period of time for the party identifies the contact type with the probability having the highest likelihood of achieving at least one of the desired outcome and the desired result by utilizing the contact type to contact the party during the particular contact period of time. At this point in particular embodiments, a best time to contact the party is identified as one of the plurality of contact periods of time based on the optimal contact types selected for the party for each of the plurality of contact periods of time and associated probabilities. Attempts may then be made to contact the party during the particular contact period of time identified as the best time to contact by using the optimal contact type selected for the party during the particular contact period of time.

The subject matter disclosed herein may be implemented as a computer-controlled apparatus, a computer process, a computing system, or as an article of manufacture such as a computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIG. 5 illustrates an example of probability calculations for an account.

DETAILED DESCRIPTION

Figure 1:
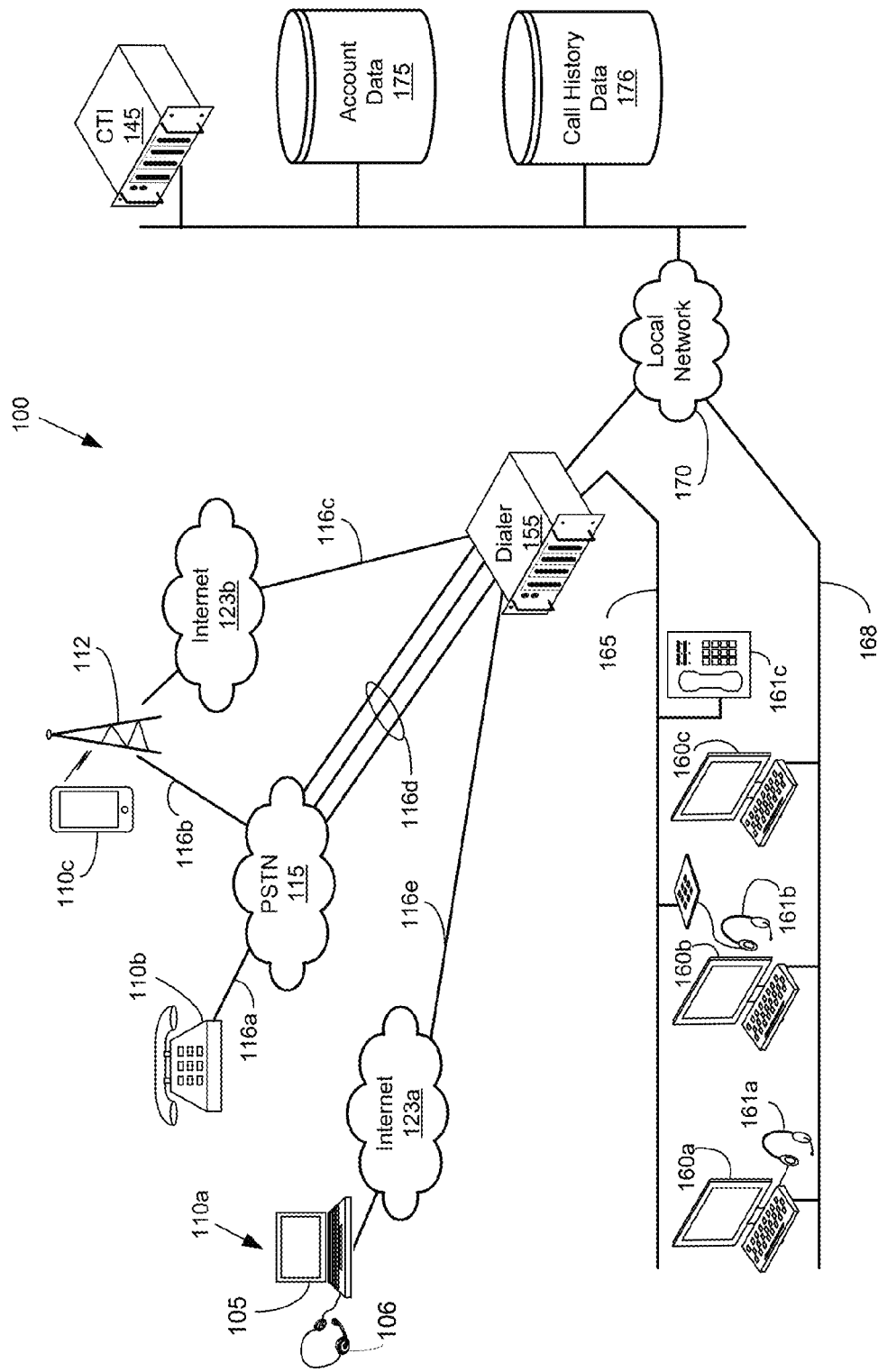
FIG. 1 shows one embodiment of a contact center architecture that may be used in accordance the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Contact Center Architecture

FIG. 1 shows one embodiment of a contact center architecture 100 that may be used in accordance the various technologies disclosed herein. Although many aspects of contact center operation are disclosed in the context of voice calls, the contact center may process other forms of communication such as, for example, facsimiles, emails, text messages, video calls, chat messages, and other forms. The term "party" without any further qualification refers to a live person (as opposed to an answering machine or voice mail service) associated with an instance of communication processed by the contact center.

The contact center shown in FIG. 1 may process voice calls that are originated by a dialer 155. In various embodiments, the dialer 155 is configured to dial one or more lists of telephone numbers to initiate outbound calls. Further, in particular embodiments, agents may use one or more lists of telephone numbers to initiate outbound calls manually. The lists of telephone numbers (e.g., "call lists") may be generated based on a number of accounts stored in some type of storage media 175 that is accessible using a local network 170. In addition, in particular instances, the dialer 155 or some other component within the contact center architecture 100 may retrieve call history information stored in some type of storage media 176 that is used in generating optimal schedules for calling the telephone numbers found on the call lists.

In particular embodiments, the dialer 155 may directly interface with voice trunks using facilities 116d to a public switched telephone network ("PSTN") 115 for originating calls. In these embodiments, a call may be routed by the PSTN 115 and may comprise various types of facilities, including, but not limited to: T1 trunks, SONET based fiber optic networks, ATM networks, PSTN trunks 116d, or other facilities 116e, 116c. Further, depending on the embodiment, after a call is originated and answered by a party, the dialer 155 may connect the call with an agent or place the call in a queue for a next available agent. In the latter case, announcements or music may be provided to the party as the party waits in the queue.

In various embodiments, the dialer 155 is a predictive dialer that makes use of one or more pacing algorithms to determine how and when to dial a group of numbers so as to minimize the likelihood of a called party being placed in a queue while maintaining effective agent utilization. That is, in particular embodiments, the dialer 155 "dials ahead" by originating more calls than there are available agents, expecting some calls not to be answered by live parties and/or more agents to become available to handle all the answered calls.

Depending on the embodiment, outbound voice calls may originate to parties using a variety of different phone types. For instance, a party may receive a call at a conventional analog telephone 110b connected to the PSTN 115 using an analog plain old telephone service ("POTS") line 116a. A party may also receive a call at a mobile device 110c, such as a smart phone or tablet, which wirelessly communicates with a mobile service provider ("MSP") 112. A call to a mobile device 110c may be routed from the PSTN 115 using an integrated services digital network ("ISDN") interface 116b or other types of interfaces that are well known to those skilled in the art. In addition, the MSP 112 may also route a call to a party that was received as packetized voice, referred to herein as voice-over-IP ("VoIP"), from an Internet provider 123b using Internet-based protocols. In turn, the call may have been routed to the Internet provider 123b over a trunk 116c from the dialer 155. For convenience, unless indicated otherwise, the term "trunk" refers to any type of facility 116c, 116d, or 116e providing voice calls to, or from, the contact center, regardless of the type of protocol or technology used. Specifically, a "trunk," as referred to herein, is not limited to time-division multiplexing ("TDM") technology.

Voice calls may also be received by a party employing a so-called "IP phone," "VoIP phone," or "soft phone" 110a. In one embodiment, this device may comprise a computing device 105, such as a laptop, desktop, or computing tablet that interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

Once outbound calls have been answered, they may be routed over facilities 165 to agents for servicing. That is, after a call is originated by the dialer 155 and a called party answers, the call may be connected with an agent. The physical area at which the agent sits is often referred to as an agent "position" and these positions are often grouped into clusters that are managed by a supervisor, who may monitor calls and the agents' productivity. According to various embodiments, an agent typically uses a computing device, such as a computer 160a-160c and a voice device 161a-161c. In particular embodiments, data may be provided to an agent's workstation computer 160a-160c over facilities 168 along with routing the call to the agent's workstation voice device 161a-161c over other facilities 165. The combination of computer 160a-160c and voice device 161a-161c may be referred to as a "workstation." Thus, the workstation collectively has a data capability and a voice capability, though separate devices may be used. In some instances, "workstation" may be used in reference to specifically either the data or voice capability at the agent's position, as appropriate to the context. For example, "routing the call to the agent's workstation" means routing a call to a voice device 161a-161c at the agent's position. Similarly, "routing the call to the agent" means routing a call to the appropriate equipment at an agent's position.

Depending on the embodiment, the voice device used by an agent may be a soft phone device exemplified by a headset 161a connected to the computer 160a. The soft phone device may be a virtual telephone implemented in part by an application program executing in a computer. The voice device may also comprise an Internet Protocol ("IP") based headset 161b or a conventional phone 161c. Thus, use of the term "phone" is intended to encompass all these types of voice devices used by an agent.

Further, in various embodiments, a CTI server 145 may be incorporated in the contact center architecture 100 to control, monitor, and/or coordinate other components of the architecture 100. Specifically, the CTI server 145 may interact with the dialer 155 to coordinate call processing. For instance, in particular embodiments, the CTI server 145 may control routing of calls from the dialer 155 to the various agent workstations, may process telephone numbers found on call lists to produce optimal schedules for calling the telephone numbers, may coordinate other forms of communication such as text messages and/or emails, and/or may provide data to other components processing the calls and/or call lists. In addition, in particular embodiments, the CTI server 145 may also monitor various components of the architecture 100. For example, the CTI server 145 may monitor the number of calls made by the contact center and/or monitor the outcome of such calls. Further, the CTI server 145 may also provide call reporting functionality based on data collected during calls such as saving such data as call history.

Although the above components may be variously referred to as a "computer" "processing device," "unit," "component" or "system" and may incorporate therein a local data store or database, or interface with an external database. Use of the word "server" herein does not require the component to interact in a client-server arrangement using web-based protocols with other components, although that may be the case. Further, the above components may be located remotely from (or co-located with) other components. Furthermore, one or more of the components may be implemented on a single processing device to perform the functions described herein.

In addition, the contact center architecture 100 may be provided as a hosted solution in particular embodiments, where the call processing functionality is provided as a communication service (a so-called "communication as a service" or "CaaS") to a contact center operator. Thus, there is no requirement that the components identified above must be actually located or controlled by a contact center operator.

Further, the agent positions can be co-located in a single physical contact center or in multiple physical contact centers. The agents can be remotely located from the other components of the contact center, and may also be remotely located from each other, sometimes referred to as a "virtual contact center." A virtual contact center may describe a scenario where agents work at home, using their own computers and voice devices as workstations. In some configurations, a single physical location of the contact center may not be readily identifiable. This may occur when the call processing functions are provided as a service in a hosted cloud computing environment and the agent positions are in their individual residences.

Those skilled in art will recognize FIG. 1 represents one possible configuration of a contact center architecture 100, and that variations are possible with respect to the protocols, configurations, facilities, technologies, and equipment used. Thus, other variations on the physical configurations are possible.

Best Time to Call

As mentioned above, organizations faced with having to contact parties to conduct some type of business with these parties are often concerned with the best time to call these parties in which a best time to call is considered the right time to call the right party and get the right outcome and/or result. Accordingly, a best time to call is generally associated with an outbound call placed to a particular party at a particular time as determined as the right time to call the party to ensure the best chance of reaching the party and getting the desired outcome and/or result.

However, with that said, many organizations may be concerned with the best time to contact parties with regard to using other forms of communication. For instance, a particular organization may wish to contact one or more parties via email and is concerned with the best time to send emails to these parties that would ensure the best chance of the emails being read by these parties and generating the desired result. Likewise, other organizations may wish to contact one or more parties via text message or traditional mail service and are concerned with the best time to send these parties text messages or letters through the mail that would ensure the best chance of the text messages or letters being read by these parties and generating the desired result. Thus, it should be understood by those of ordinary skill in the art that although the remainder of this disclosure describes various embodiments of the invention with regard to identifying the best times to place outbound calls to various parties, the application of the various technologies described herein are not limited solely to placing outbound calls and may be used in the context of placing other forms/types of communication.

Process Overview

Figure 2:
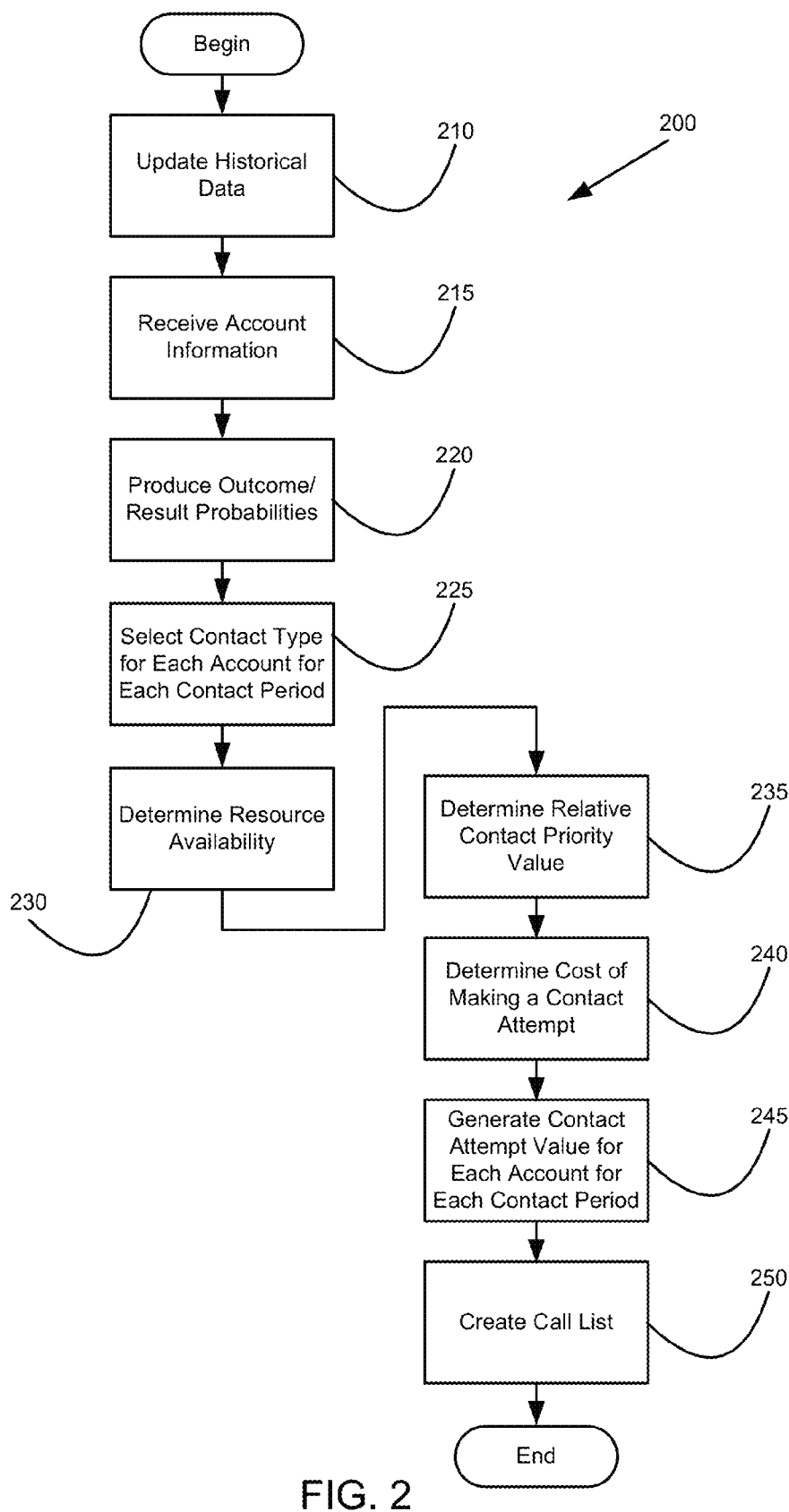
FIG. 2 illustrates a general process flow for producing a call list in accordance with various embodiments of the invention.

Turning now to FIG. 2, a general process flow for producing a call list in accordance with various embodiments is shown. An example is now provided to assist in explaining the process flow. In this example, a contact center is conducting daily outbound campaigns for collection purposes. Accordingly, the contact center processes a call list of telephone numbers each work day that are associated with delinquent accounts. For example, the call list of telephone numbers may be associated with accounts for individuals who are currently delinquent on at least one payment for a car loan. Thus, the contact center's goal is to collect on as many delinquent accounts as possible during the work day. That is to say, the contact center's goal is to call each account at the right time during the work day to reach the intended party and to obtain a promise-to-pay from the party (e.g., call each account at the best time to call).

Therefore, looking at FIG. 2, the process 200 begins with uploading contact attempt data from the previous work day and updating the historical contact attempt data accordingly in Step 210. In general, the contact attempt data for a particular work day provides information on the contact attempts made for various accounts on the particular work day. For instance, the contact attempt data may include information such as the accounts that the contact center placed outbound calls to for the particular work day, the time of day each outbound call was placed, the contact type the call was placed to for each outbound call such as, for example, home phone, work phone, or cell phone, and/or the outcome and/or result of each outbound call placed to an account.

In various embodiments, this particular step of the process 200 may be carried out routinely during a time that does not interfere with contact center operation. For example, the contact center may run a "batch job" nightly that uploads the contact attempt data from the previous work day, formats the data accordingly, and then loads the data along with the historical contact attempt data. The historical call attempt data may be stored in any number of different types of data structures such as, for example, one or more databases or files, and these data structures may reside on any number of different types of data storage media. Further, the historical call attempt data may encompass information on any number of previous call attempts made by the contact center during any length of past time period as deemed appropriate by the contact center.

Continuing on with the process 200, account information is received on a set of accounts to be contacted for the work day in Step 215. That is to say, account information is received on various accounts that the contact center is to place outbound calls to for the work day. Depending on the embodiment, the account information may include different pieces of information with respect to each account. For instance, the account information for a particular account may include information on the individual associated with the account, information on the delinquency of the account such as the amount delinquent and the time length of the delinquency, information on the different types of contacts available for the account such as a home phone, a work phone, a cell phone, etc., and/or information on the last contact attempt made for the account such as the date and time of the attempt and the outcome and/or result of the attempt. Those of ordinary skill in the art can envision other types of information that may be included in the account information in light of this disclosure.

The next Step 220 of the process 200 involves producing outcome/result probabilities for each account, for each contact type, and for each contact period of the work day. Depending on the embodiment, a contact period may be defined as any duration of time that occurs during the work day. For instance, in one embodiment, the contact center's work day may be from 8:00 a.m. to 8:00 p.m. and the contact periods are defined as hourly periods. Thus, in this instance, the contact center's work day consists of twelve different hourly contact periods with the first contact period starting at 8:00 a.m. and ending at 8:59 a.m. and the twelfth contact period starting at 7:00 p.m. and ending at 8:00 p.m. In other instances, the contact periods for a work day may be defined differently such as two-hour periods of time or half-hour periods of time. While in other instances, the contact periods for a work day may vary over the length of the work day. For example, in one embodiment, the contact center may define the contact periods for a first portion of the work day starting at 8:00 a.m. and ending at 1:59 p.m. as two-hour periods of time and the contact periods for a second portion of the work day starting at 2:00 p.m. and ending at 8:00 p.m. as hourly periods of time.

In various embodiments, the contact center is interested in the probabilities of different outcomes occurring for outbound calls placed to each contact type (e.g., device) associated with each account during each contact period. With respect to placing an outbound call to a particular contact type associated with an account during a contact period, typically three types of outcomes for the outbound call are possible. The first outcome is the individual for whom the call was placed to contact actually answers the call. This outcome is typically referred to as a right party contact ("RPC"). The second outcome is an individual answers the call. However, this individual who has answered the call is not the person for whom the call was placed to contact. This outcome is typically referred to as a wrong party contact ("WPC"). While the third outcome is the call is not answered by any individual. For instance, the call may have been answered by a voice mail system or an answering machine, may not have been answered at all and continues to ring, or may have reached a not-in-service indication. This outcome is typically referred to as no contact.

Furthermore, an account may have more than one contact type for contacting the individual associated with the account. For example, the individual may have a home phone, a work phone, and/or a cell phone. Thus, the contact center may be interested in the probabilities of each outcome occurring for an outbound call placed to each contact type associated with the account during each contact period because for any particular contact period, it may be more likely for a particular outcome to occur (a RPC) for an outbound call placed for the account using one contact type over another. For example, the individual associated with a particular account may typically be at work from 9:00 a.m. to 5:00 p.m., Monday thru Friday. Therefore, in this example, it may be more likely to reach the individual (make a RPC) by placing a call to the individual's work phone instead of the individual's home phone during a contact period that occurs between 9:00 a.m. and 5:00 p.m. on these days. Thus, taking into consideration the different device types associated with accounts may increase the likelihood of finding a best time to call each of these accounts during the contact center's work day that will result in a desired outcome (e.g., a RPC).

In various embodiments, the contact center may also be interested in the probability of a particular result (e.g., promise-to-pay) occurring from a RPC. For instance, in particular embodiments, the contact center may be interested in the probability of a particular result occurring from a RPC for a particular account with respect to each contact period for the work day, resulting in multiple result probabilities for the particular account comprising a result probability for each contact period of the work day for the particular account. While in other embodiments, the contact center may be interested in the probability of getting a result (e.g., a promise-to-pay) for the particular account when a RPC occurs, regardless of which contact period the RPC occurred in, resulting in a single result probability for the particular account.

In many instances, the approach used by the contact center may be dependent on the amount of historical call attempt data that is available. For example, a contact center may not have enough historical call attempt data available with respect to determining a probability of a particular result occurring from a RPC in each contact period because historically speaking for any one account, contact periods may exist in which too few RPCs have occurred (or none at all) for the account that provide adequate sample sizes for determining statistically reliable probabilities. Under some circumstances, a contact center may be able to compensate inadequate sample sizes for a particular contact period for an account by including historical data associated with other similar accounts for the particular contact period. However, again, this solution is also dependent on the amount of historical call attempt data that is available.

For instance, depending on the embodiment, the contact center may produce outcome/result probabilities as shown in Tables 1 and 2:

TABLE 1

Probabilities with promise-to-pay (P-to-P) included along with RPC.

|  |  | Probabilities For Each Contact Period | | | |
|---|---|---|---|---|---|
| For Each Account | Contact Type A | RPC + P-to-P | RPC + No P-to-P | WPC | NC |
|  | Contact Type B | RPC + P-to-P | RPC + No P-to-P | WPC | NC |
|  | Contact Type C | RPC + P-to-P | RPC + No P-to-P | WPC | NC |

TABLE 2

Probabilities with P-to-P and RPC separated.

|  |  | Probability Over Entire History | Probabilities For Each Contact Period | | |
|---|---|---|---|---|---|
| For Each Account | Contact Type A | P-to-P | RPC | WPC | NC |
|  | Contact Type B |  | RPC | WPC | NC |
|  | Contact Type C |  | RPC | WPC | NC |

For the first approach shown in Table 1, four different probabilities are determined for each contact type for a particular account over each contact period: a probability of making a RPC that results in a promise-to-pay, a probability of making a RPC that does not result in a promise-to-pay, a probability of making a WPC, and a probability of making no contact. Accordingly, this particular approach would likely require the contact center to have an extensive amount of historical call attempt data for each account (and/or similar accounts) being contacted since the probability of a RPC resulting in a promise-to-pay for a particular account is broken down with respect to the contact type (e.g., home phone, work phone, and cell phone) and contact period.

Wherein for the second approach shown in Table 2, only three different probabilities are determined for each contact type for a particular account over each contact period: a probability of making a RPC, a probability of making a WPC, and a probability of making no contact. For this approach, only a single probability of a RPC resulting in a promise-to-pay is determined for each account over the entire history for the account without considering the type of contact used or the contact period. Thus, this particular approach would not likely require as extensive an amount of historical contact attempt data as the first approach since only a single probability involving a promise-to-pay is determined for any particular account.

Once the desired outcome/result probabilities are determined for each account, the next Step 225 in the process 200 involves selecting the appropriate contact type for each account for each contact period. In various embodiments, the appropriate contact type is typically the contact type that provides the best option (e.g., highest probability) for achieving the desired outcome and/or result. For instance, a particular account may have a home phone, a work phone, and a cell phone in which the probabilities of making a RPC that results in a promise-to-pay may be 0.07, 0.10, and 0.06, respectively, for a particular contact period. Thus, the appropriate (e.g., optimal) contact type to use during this particular contact period is the account's work phone. Similarly, if the contact types for the particular account for making a RPC (without consideration of whether a promise-to-pay is received) are 0.05, 0.30, and 0.33, respectfully, for a particular contact period then the appropriate contact type to use during the particular contact period is the account's cell phone.

At this point, the resources available for each contact period are determined in Step 230. For various embodiments, this step generally involves determining the number of agents that will be available during each particular contact period to field outbound calls. Thus, depending on the embodiment, this determination may involve reviewing one or more schedules to ascertain the number of agents scheduled to work during each contact period. In addition, this determination may involve taking into consideration typical daily activities of agents that detract from fielding outbound calls such as breaks, lunch, training, and time spent idling, performing wrap-up work following a call, and/or fielding inbound calls. Depending on the embodiment, the times associated with each of these activities may be estimated and/or averaged based on historical data. In addition, in particular embodiments, other types of resources may be considered such as, for example, the number of available trunks for placing outbound calls.

Continuing on, a relative contact priority value is determined for each account in Step 235. The relative contact priority value provides a measure of the importance of contacting the account with respect to the other accounts to be contacted over the work day. Depending on the embodiment, the relative contact priority value can be based on a single characteristic of the account such as the dollar amount the account is delinquent or the probability of a RPC resulting in a promise-to-pay, or may be derived from multiple characteristics such as, for instance, a combination of the dollar amount delinquent, the probability of a RPC resulting in a promise-to-pay, the number of days delinquent, and/or the number of delinquencies within the past year. For example, in one embodiment, the relative contact priority value for an account may be determined by multiplying the dollar amount delinquent, the number of days delinquent, and the number of delinquencies within the past year together and dividing this number by the amount paid by the account over the past year. Further, one or more of the characteristics may be weighted to allow for greater importance for these characteristics. Those of ordinary skill in the art can envision other characteristics and/or calculations that may be used in determining a relative contact priority value for an account in light of this disclosure.

Next, a cost of making a contact attempt is determined in Step 240. In various embodiments, this cost is generally defined in terms of the amount of time (e.g., duration of time) involved in making and handling an outbound call. Thus, the cost of making a contact attempt is defined in terms of multiple values in many instances since the time required in making a contact is dependent upon the type of call (e.g., autodialer or manual) and the outcome (e.g., RPC, WPC, or no contact) and result (promise-to-pay, no promise-to-pay) of the call. Thus, depending on the embodiment, the cost of making a contact may include values for: (1) autodialing an account, making a RPC, and receiving a promise-to-pay; (2) autodialing an account, making a RPC, and not receiving a promise-to-pay; (3) manually dialing an account, making a RPC, and receiving a promise-to-pay; (4) manually dialing an account, making a RPC, and not receiving a promise-to-pay; (5) autodialing an account and making a WPC; (6) manually dialing an account and making a WPC; (7) autodialing an account and making no contact; and (8) manually dialing an account and making no contact. Depending on the embodiment, each of these values may be estimated and/or averaged based on historical data for each type of call, outcome, and result.

Once the outcome/result probabilities have been determined and selected for the appropriate contact type for each account and for each contact period, the relative contact priority value for each account has been determined, and values for cost of making a contact have been determined, a contact attempt value is generated for each account for each contact period in Step 245. This contact priority value represents a relative desirability of making a contact attempt for a particular account in a particular contact period. Thus, in various embodiments, generating the contact priority values involves maximizing over all accounts and all contact periods the relative account priority value, probability of RPC (and in some instances promise-to-pay), and proportion of a particular account called during a particular contact period.

At this point, the contact attempt value for each contact period is associated with its respective account to create a call list (e.g., optimal schedule) for conducting the outbound campaign for the work day in Step 250. Thus, for any contact period, the call list provides a sequential list of contacts in descending order with respect to desirability to attempt during the particular contact period based on the contact attempt values generated for each account for the particular contact period. As mentioned, since many of the accounts may have multiple contact types, the contacts to be placed during any particular contact period may involve different contact types depending on the probabilities of making a RPC for each contact type associated with a particular account. For instance, the call list may include for the contact period spanning 9:00 a.m. to 9:59 a.m. a work phone number for a first account and a cell phone number for a second account. In this instance, the contact center may have a home phone number, a work phone number, and a cell phone number for both the first and second accounts. However, the probability of making a RPC may be highest during this contact period for the first account when the attempt is made to the first account's work phone whereas the probability of making a RPC may be highest during this contact period for the second account when the attempt is made to the second account's cell phone.

Further, for a later contact period (e.g., spanning 2:00 p.m. to 2:59 p.m.), the call list may now include a home phone number for the first account instead of the first account's work phone number. This is because the probability of making a RPC may be higher during this later contact period for the first account when the attempt is made to the first account's home phone instead of to the first account's work phone as in the previous contact period. Thus, in various embodiments, the call list does not only provide a sequential list of contacts in descending order to attempt during any particular contact period, but the call list also provides the sequential list with respect to which contact type should be used for each contact (e.g., account phone number) found on the sequential list. Accordingly, various embodiments of the invention provide a substantial advantage over traditional processes for determining a best time to contact an account by not only taking into consideration a history with respect to previous attempts made to contact the account but by also taking into consideration a history with respect to previous attempts made to the account's different contact types in calculating a best time to contact the account.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Historical Contact Attempt Data Update Module

Figure 3:
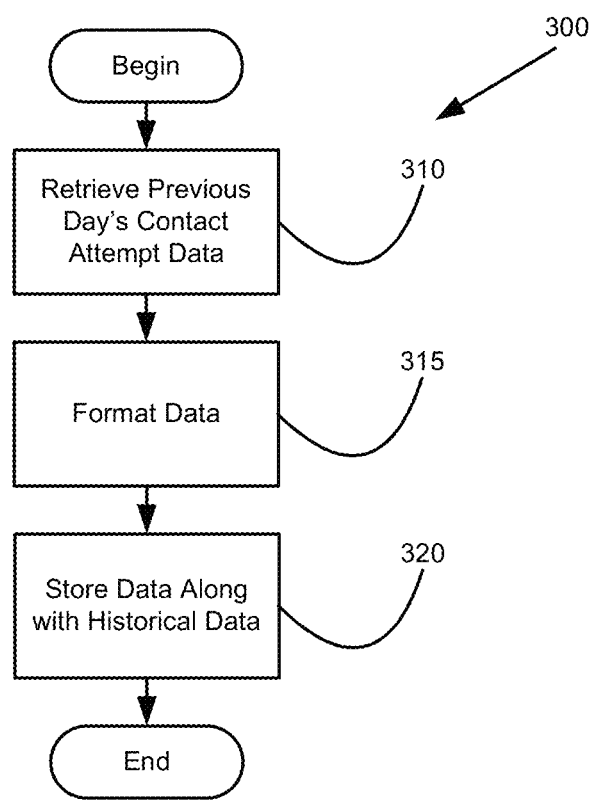
FIG. 3 illustrates a process flow for updating historical call attempt data according to various embodiments of the invention.

FIG. 3 provides additional details regarding a process flow for updating the historical contact attempt data based on data for a previous work day's contact attempts according to various embodiments of the invention. Accordingly, FIG. 3 provides a flow diagram showing a historical contact attempt data update ("HCADU") module for performing such functionality according to various embodiments of the invention. More specifically, the flow diagram shown in FIG. 3 may correspond to operations carried out by a processor of a component within the contact center's architecture 100, such the CTI server 145, as it executes the HCADU module stored in the component's volatile and/or nonvolatile memory. As previously mentioned, the HCADU module may be configured to carry out the process 300 shown in FIG. 3 during a time that does not interfere with contact center operation. For example, in particular embodiments, the HCADU module carries out the process 300 shown in FIG. 3 as a nightly "batch job."

Turning now to FIG. 3, the process 300 involves retrieving the previous work day's contact attempt data in Operation 310. Depending on the embodiment, the previous work day's contact attempt data may be stored in any number of different types of media such as non-volatile data storage located within the contact center architecture 100 or non-volatile or volatile storage residing on a component within the contact center architecture 100. For instance, in one embodiment, the dialer 155 may save such information on local volatile memory as outbound calls are being placed by the dialer 155 during the previous day.

The previous work day's contact attempt data may include information on each outbound call attempt made during the previous work day such as, for instance, information on the account associated with a contact (e.g., a call) attempt, the contact type used for the contact attempt, the time the contact attempt was made, the outcome of the contact attempt, and/or the result of the contact attempt if a RPC was made. Further, the previous work day's contact attempt information may originate from more than one source. For instance, in particular embodiments, some parts of the contact attempt information may originate from the dialer 155 while other parts of the information may originate from the agent fielding a particular contact attempt. For example, the dialer 155 may provide information on the account associated with the contact attempt, the contact type used for the contact attempt, the time the contact attempt was placed, and the outcome of the contact attempt. While the agent may provide information on the result of the contact attempt if the attempt resulted in a RPC and was forwarded to the agent.

Once the previous work day's contact attempt data has been retrieved, the HCADU module formats the data in Operation 315. That is to say, in particular embodiments, the previous work day's contact attempt data may be in a raw form that needs to be properly formatted so it may be saved permanently along with the historical contact attempt data. Thus, for these embodiments, the HCADU module formats the previous work day's contact attempt data so that the format is appropriate for saving along with the historical contact attempt data. In addition, in particular embodiments, the HCADU module may also summarize the previous work day's contact attempt data to put the data in a form that may be more usable by contact center personnel. For instance, in one embodiment, the HCADU module summarizes the previous work day's contact attempt data to include a total number of contacts attempted, contacted, and promises-to-pay made over the previous work day.

Finally, once the previous work day's contact attempt data has been properly formatted, the HCADU module stores the formatted data along with the historical contact attempt data in Operation 320. Accordingly, this data may now be used for determining the best time to call one or more accounts for future purposes.

Best Time to Call Module

Figure 4:
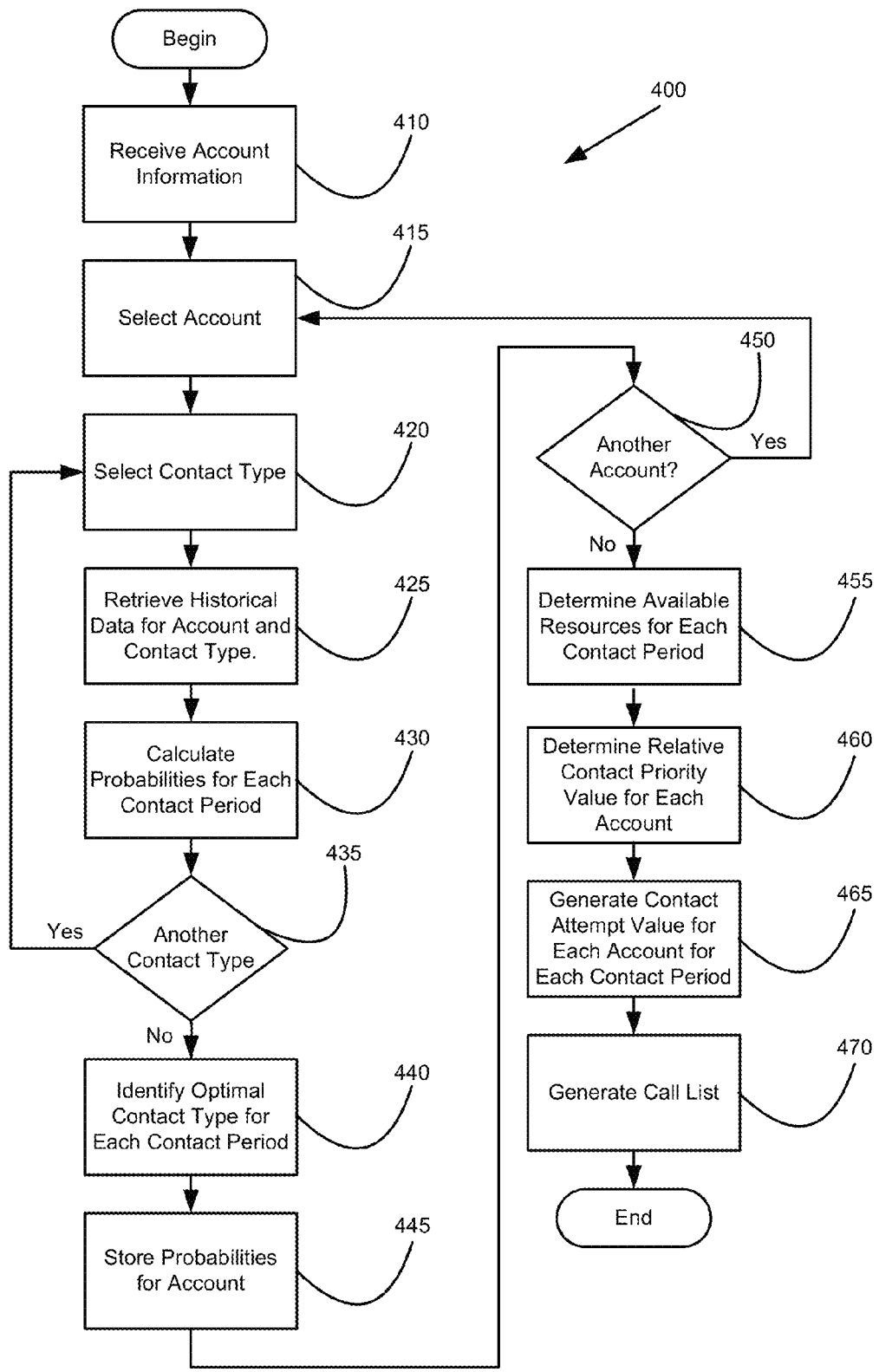
FIG. 4 illustrates a process flow for generating a call list according to various embodiments of the invention.

Continuing on, the historical contact attempt data may now be used in determining best times to call one or more accounts for future time periods. For instance, a contact center may wish to attempt to contact a number of delinquent accounts over the following work day and may wish to identify a best time to call each account. Accordingly, FIG. 4 provides additional details regarding a process flow for constructing a call list to identify a best time to call each account in accordance with various embodiments of the invention. Specifically, FIG. 4 provides a flow diagram showing a best time to call ("BTC") module for performing such functionality according to various embodiments of the invention. Thus, the flow diagram shown in FIG. 4 may correspond to operations carried out by a processor of a component within the contact center architecture 100, such as the CTI server 145, as it executes the BTC module stored in the component's volatile and/or nonvolatile memory.

Turning now to FIG. 4, the process 400 begins with the BTC module receiving account information in Operation 410. This account information is for a plurality of accounts to be contacted over the following work day. Thus, in particular embodiments, the account information may be provided as a standard call list simply listing the accounts to be contacted over the following work day along with corresponding information for each account. For instance, the account information for a particular account may include information on the individual associated with the account, information on the delinquency of the account such as the amount delinquent and the time length of the delinquency, information on the different types of contact types available for the account such as a home phone, a work phone, a cell phone, etc., and/or information on the last contact attempt made for the account such as the date and time of the attempt and the outcome of the attempt.

Next, the BTC module selects a particular account from the account information in Operation 415. As previously mentioned, the account information for the selected account may indicate that the contact center has more than one contact type for the account. For instance, the contact center may have a number for a home phone, a work phone, and a cell phone for the account. Further, the contact information may indicate whether the contact type is a landline/wireline contact type or a wireless contact type. Such information may be important because one or more regulations may indicate how a contact type may be dialed base on whether the contact type is a landline/wireline or a wireless device. For example, the Telephone Consumer Protection Act of 1991 ("TCPA") indicates certain calls placed to wireless devices must not be placed using an "autodialer." Accordingly, many contact centers will manually dial numbers for wireless devices to ensure they are complying with the TCPA.

At this point, the BTC module selects a first contact type for the selected account in Operation 420. For example, if the selected account identifies numbers for a home phone, a work phone, and a cell phone, then the BTC module initially selects the home phone. Accordingly, the BTC module retrieves historical contact attempt data for the selected account and the selected contact type in Operation 425. In various embodiments, the historical contact attempt data includes information on previous contact attempts made for the selected account and selected contact type. Thus, the historical contact attempt data may include information for each previous contact attempt made for the selected account using the selected contact type such as when (e.g., date and time) the previous contact attempt was made, the outcome of the previous contact attempt, and the result of the previous contact attempt if the attempt resulted in a RPC.

Further, in particular embodiments, the BTC module may include information for other similar accounts in the historical contact attempt data if the data for the selected account and selected contact type is not considered extensive enough (e.g., large enough) for producing statistically sound probabilities for the selected account and selected contact type. These similar accounts may be identified by using one or more rules defined by the contact center. For instance, the contact center may define a rule that a similar account is an account with a number of days delinquent equal to or greater than the number of days delinquent from the selected account.

Next, the BTC module calculates one or more outcome/result probabilities for the selected account and contact type over each contact period of the following work day in Operation 430. As previously mentioned, a contact period may be defined as any duration of time that occurs during the work day. For instance, the contact center may define the contact periods as hourly periods of time beginning at 8:00 a.m. and ending at 8:00 p.m. Thus, in this instance, the BTC module calculates the appropriate probabilities for the selected account and contact type for each hourly contact period beginning at 8:00 a.m. and ending at 8:00 p.m.

Also previously mentioned, the contact center may decide to use probabilities for each time period that are outcome based or both outcome and result based. Thus, depending on the embodiment, the BTC module may be configured to calculate probabilities for the selected account and contact type over each contact period with respect to: (1) RPC; (2) WPC; and (3) no contact, or with respect to: (1) RPC with promise-to-pay; (2) RPC without promise-to-pay; (3) WPC; and (4) no contact.

The probability models used may be developed using any suitable method. For instance, in particular embodiments, the probability models are developed by applying a stepwise polytomous logistic regression technique. For example, a random sample containing the three different outcomes, RPC, WPC, and no contact, is drawn from the historical contact attempt data and given the random sample $X=(x_1, x_2,$ through $x_n)$ where $x_1$ is an account in the sample (an m-dimensional vector whose components are the candidate characteristics), the likelihood function for a pair of m-dimensional vectors a and b is defined as follows:

$L(a,b) = \Pi \exp(a^T x_i)/(1+\exp(a^T x_i)+\exp(b^T x_i))x$
$i \in G1$
$\Pi \exp(b^T x_i)/(1+\exp(a^T x_i)+\exp(b^T x_i))x$
$i \in G2$
$\Pi 1/(1+\exp(a^T x_i)+\exp(b^T x_i))$
$i \in G3$ "a" is the RPC score and "b" is the WPC score.

In this instance, the modeling process involves a series of steps in which characteristics are added to the models. At each step of the modeling process, the adjusted chi-squared statistics for all of the variables for either of the two possible scores not in the model are computed and examined. If the largest of these statistics is significant at a defined level, the variable is entered into a model and is never removed from the model. This stepwise process of entering variables into the models is continued until none of the remaining variables meet the defined significance test, in the preferred case 99%. After the models are constructed, the intercepts are adjusted to reflect the true proportions of the three categories, rather than those represented in the sample. Once the probability models are built, model parameters are produced in terms of a series of characteristics associated with a weighting factor or score.

Accordingly, the BTC module calculates the probability values by matching characteristics from the selected account to the model parameters and then converting the resultant model value to a probability between zero and one. Although the outcome probabilities may be defined as a RPC probability and a non-RPC probability, the preferred form defines three probabilities for three potential contact attempt outcomes comprising a RPC probability, a WPC probability, and a no connect probability, the latter representing the probability of all outcomes other than a RPC or a WPC.

Once the BTC module calculates the required probabilities for the selected account and contact type for each of the contact periods, the BTC module next determines whether another contact type exists for the selected account in Operation 435. If so, then the BTC module returns to Operation 420 of the process 400 and selects the next contact type for the selected account and repeats the operations described above for the next contact type.

If instead another contact type does not exist for the selected account, then the BTC module identifies the optimal contact type for the selected account for each contact period in Operation 440. As previously mentioned, in various embodiments, the optimal contact type for each contact period is typically the contact type that provides the best option (e.g., highest probability) for achieving the desired outcome and/or result during the contact period.

For instance, turning to FIG. 5, a table is provided displaying probability values calculated for Account A 510 for four contact periods. In this instance, the contact center has three contact types available for Account A 510 that include a home phone 515, a work phone 520, and a cell phone 525. The four contact periods shown are 9:00 a.m. to 9:59 a.m. 530, 11:00 a.m. to 11:59 a.m. 535, 3:00 p.m. to 3:59 p.m. 540, and 6:00 p.m. to 6:59 p.m. 545. Accordingly, probabilities of making a RPC, a WPC, and a no contact are calculated and shown for each contact type during each of the four contact periods in the table. As shown in the table, the optimal contact type to use during the 9:00 a.m. to 9:59 a.m. contact period 530 for Account A 510 is Account A's cell phone 525. This is because placing a call to this particular contact type for Account A 510 during the 9:00 a.m. to 9:59 a.m. contact period 530 provides the contact center with the highest probability 550 of making a RPC. Likewise, the optimal contact type to using during the 11:00 a.m. to 11:59 a.m. contact period 535 for Account A 510 is Account A's cell phone 525 because again placing a call to Account A's cell phone 525 during the 11:00 a.m. to 11:59 a.m. contact period 535 provides the contact center with the highest probability 555 of making a RPC.

However, as the work day moves into the 3:00 p.m. to 3:59 p.m. and 6:00 p.m. to 6:59 p.m. contact periods 540, 545, other contact types besides Account A's cell phone 525 are considered optimal with respect to providing the contact center with the highest probability of making a RPC. Specifically, Account A's work phone 520 provides the contact center with the highest probability 560 of making a RPC during the 3:00 p.m. to 3:59 p.m. contact period 540 and Account A's home phone 515 provides the contact center with the highest probability 565 of making a RPC during the 6:00 p.m. to 6:59 p.m. contact period 545. As one can see, the optimal contact type to use during the different contact periods may change from period to period. For example, Account A 510 may have a part-time job in the afternoons from 12:00 p.m. to 5:00 p.m. and often during the morning hours from 8:00 a.m. to 12:00 p.m., he run errands. Once Account A 510 leaves work at 5:00 p.m., he typically returns home to help prepare dinner for the family. Therefore, during the morning hours from 8:00 a.m. to 12:00 p.m., Account A 510 may be easier to reach on his cell phone 525, while during work hours from 12:00 p.m. to 5:00 p.m., Account A 510 may be easier to reach on his work phone 520. Similarly, during the evening hours after 5:00 p.m., Account A 510 may be easier to reach on his home phone 515. Thus, by considering the probabilities of making a RPC for each of Account A's contact types 515, 520, 525 during each contact period 530, 535, 540, 545, the contact center is able to take into account Account A's 510 daily schedule and improve the contact center's chances for achieving the desired outcome of actually reaching Account A 510 on a phone call.

Returning now to FIG. 4, once the optimal contact type for each contact period has been identified, the BTC module stores the outcome/result probabilities for the optimal contact type for each of the contact periods for the account in Operation 445. Depending on the embodiment, the BTC module may store the probabilities in volatile or non-volatile memory. In particular embodiments, additional information may be stored along with the outcome/result probabilities such as an identifier of the optimal contact type for each contact period, whether the optimal contact type is landline/wireline or wireless device, and/or other calculated probabilities such as a probability of obtaining a promise-to-pay from the account if a RPC is made.

At this point, the BTC module determines whether another account is found in the account information in Operation 450. If so, then the BTC module returns to Operation 415 and selects the next account from the account information. The BTC module then repeats the operations described above with respect to the new account.

Once the BTC module has processed all of the accounts from the account information, the BTC module next determines the resources available for each contact period in Operation 455. In general, the resources available during a particular contact period define the number of outbound calls that can be placed during the particular contact period. In various embodiments, the resources available for a contact period are typically viewed as the amount of time contact center agents are available to handle outbound calls during the contact period. However, in particular embodiments, other types of resources may be considered. For instance, in one embodiment, the resources available for a particular contact period may also consider the number of trunks that are available to place outbound calls during the particular contact period.

Accordingly, in various embodiments, the BTC module may review one or more schedules to ascertain the number of agents scheduled to work during each contact period. In addition, the BTC module may take into consideration typical daily activities of agents that detract from fielding outbound calls such as breaks, lunch, training, and time spent idling, performing wrap-up work following a call, and/or fielding inbound calls. For instance, in one embodiment, the contact center defines set times or determines historical averages for these daily activities and the BTC module then uses these set times and averages in determining the amount of time that is available for agents to handle calls during each contact period. For example, ten agents may be scheduled to work during a contact period that is to take place from 9:00 a.m. to 9:59 a.m. During this contact period, five of the agents are scheduled to take a fifteen minute break at 9:30 a.m. Thus, the BTC module would determine that the resources available for this time period involve five agents fielding outbound calls for fifty-nine minutes and five agents fielding outbound calls for forty-four minutes and thus, would amount to five hundred and fifteen total minutes of agent availability to handle outbound calls during the contact period.

In addition, in various embodiments, the contact center also defines a cost of making a contact attempt. Similar to the available resources, the cost of making a contact attempt is generally defined in terms of the amount of time (e.g., duration of time) involved in making and handling an outbound call. Accordingly, the contact center may define the cost of making a contact attempt in terms of multiple values in many instances since the time required in making a contact is dependent upon the type of call placed (e.g., autodialer or manual) and the outcome (e.g., RPC, WPC, or no contact) and result (promise-to-pay, no promise-to-pay) of the call. Depending on the embodiment, the contact center may estimate and/or calculate an average for each of these values based on historical data for each type of call, outcome, and result.

For instance, in one embodiment, the contact center determines average times for making a contact with respect to: (1) autodialing an account, making a RPC, and receiving a promise-to-pay; (2) autodialing an account, making a RPC, and not receiving a promise-to-pay; (3) manually dialing an account, making a RPC, and receiving a promise-to-pay; (4) manually dialing an account, making a RPC, and not receiving a promise-to-pay; (5) autodialing an account and making a WPC; (6) manually dialing an account and making a WPC; (7) autodialing an account and making no contact; and (8) manually dialing an account and making no contact. As one can see, each determined value represents a cost (e.g., an amount of time) associated with placing an outbound call for a particular type of call (e.g., autodialer or manual) that results in a particular outcome (e.g., RPC, WPC, or no contact) and for RPCs, a particular result (e.g., promise-to-pay or no promise-to-pay). As will be shown, these determined values are then used by the BTC module in generating a call list for various accounts and the work day.

Continuing on, in Operation 460, the BTC module determines the relative contact priority value for each account. As previously mentioned, the relative contact priority value provides a measure of the importance of contacting an account with respect to the other accounts to be contacted over the work day. Depending on the embodiment, the contact center may base the relative contact priority value on a single characteristic of the account or on multiple characteristics of the account. For instance, in particular embodiments, the contact center may simply consider the dollar amount the account is delinquent or the probability of a RPC resulting in a promise-to-pay. While in other embodiments, the contact center may consider multiple characteristics such as a combination of the dollar amount delinquent, the probability of a RPC resulting in a promise-to-pay, the number of days delinquent, and/or the number of delinquencies within the past year. Further, one or more of the characteristics may be weighted to allow for greater importance for these characteristics. Accordingly, the BTC module determines the relative contact priority value for each account based on the identified characteristics. For example, in one embodiment, the BTC module determines the relative contact priority value for each account by multiplying the dollar amount delinquent, the number of days delinquent, and the number of delinquencies within the past year for the account and dividing this number by the amount paid by the account over the past year.

Next, the BTC module generates a contact attempt value for each account for each contact period in Operation 465. As previously mentioned, the contact priority value represents a relative desirability of making a contact attempt for a particular account in a particular contact period. Accordingly, in various embodiments, generating the contact priority values involves maximizing over all accounts and all contact periods the relative account priority value, probability of RPC (and in some instances promise-to-pay), and proportion of a particular account called during a particular contact period.

For instance, in particular embodiments, the basic problem can be expressed in terms of a linear program:

$$(LP1) \max_{X_{it}} \sum_i \sum_t C_{it} R_{it} X_{it}$$

With the constraints $$\forall i, t: X_{it} \geq 0$$

$$\forall i: \sum_t X_{it} \leq 1$$

$$\forall t: \sum_t (tacp(R_{it}) + tacn(R_{it}) + tmcp(R_{it}) + tmcn(R_{it}) +$$

$$tam(W_{it}) + tmm(W_{it}) + tan(N_{it}) + tmn(N_{it}))R_{it} \leq h_t$$

Where $i$ = account 1 ... N
$t$ = contact period 1 ... T
$X_{it}$ = proportion of account $i$ called during contact period $t$
$R_{it}$ = right party contact probability during contact period $t$ for account $i$
$W_{it}$ = wrong party contact probability during contact period $t$ for account $i$
$N_{it}$ = no contact probability during contact period $t$ for account $i$
$tacp$ = average duration of contact attempt made by autodialer and resulting in right party contact and a promise to pay
$tacn$ = average duration of contact attempt made by autodialer and resulting in right party contact and no promise to pay
$tmcp$ = average duration of contact attempt made manually and resulting in right party contact and a promise to pay
$tmcn$ = average duration of contact attempt made manually and resulting in right party contact and no promise to pay
$tam$ = average duration of contact attempt made by autodialer and resulting in wrong party contact
$tmm$ = average duration of contact attempt made manually and resulting in wrong party contact
$tan$ = average duration of contact attempt made by autodialer and resulting in no contact
$tmn$ = average duration of contact attempt made manually and resulting in no contact
$h_t$ = resources available during contact period $t$
$C_{it}$ = priority value for account $i$ during contact period $t$ The nature of the solution to this linear program guarantees that a solution exists that is essentially integer, either 0 or 1. The linear program can be solved with a general solution process, for example simplex, an interior point method, or preferably using a Lagrangian function.

Finally, in Operation 470, the BTC module generates a call list to use for the work day. Accordingly, in various embodiments, the BTC module accomplishes this task by associating the contact attempt value for each contact period with its respective account to create the call list. As a result, in particular embodiments, the BTC module sorts the accounts based on contact attempt values and provides a sequential list of contacts for each contact period in descending order with respect to desirability to attempt to contact the accounts during the contact period. While in other embodiments, the call list simply identifies an optimal contact period for each account without the accounts being sorted sequentially. Thus, the call list essentially provides a best time to call each account with respect to a time of the day (e.g., contact period) and contact type (e.g., home, work, or cell phone).

Depending on the embodiment, the call list may only include a particular account once with respect to a single contact period or multiple times with respect to multiple contact periods. For instance, in particular embodiments, the call list may only include each particular account once to be called during a single contact period (e.g., the contact period having the highest probability of making a RPC or RPC+a promise-to-day for the account) for the work day to ensure that a call is placed to the account during the best time to call the account.

While in other embodiments, the call list may include a sequential list for each contact period that includes each account. Accordingly, for these embodiments, the contact center may begin at the beginning of the sequential list of accounts for a particular contact period and work down through the list, placing calls to the accounts, until the contact period expires. At that point, the contact center may then move on to the sequential list for the next contact period and begin at the top of this sequential list to place calls to the accounts accordingly during the next contact period.

For example, a call list may include an account in a first contact period near the top of the sequential list of contacts ensuring that a call will likely be placed to the account during the first contact period. In addition, the call list may also include the account in a second, later contact period near the top of the sequential list of contacts also ensuring that a call will likely be placed to the account during the second, later contact period. In this example, when this account is to be called during the second, later contact period the contact center may check to determine whether the account should actually be called during the second, later contact period. For instance, the contact center may determine whether a call was actually placed to the account during the first contact period and if so, what were the outcome and/or result of that call. In addition, the contact center may determine whether a call placed during the second, later contact period is compliant with respect to one or more external or internal regulations. For example, the contact center may determine if a called placed to the account during the second, later contact period would violate an allowable number of attempts for the account and/or be outside of an allowable calling window. Those of ordinary skill in the art can envision other determinations a contact center may make with respect to placing a call to the account during the second, later contact period in light of this disclosure.

Further, in particular embodiments, the call list may be generated based on multiple optimization windows defined by the contact center in which an attempt to contact each account may be made once for each optimization window. Accordingly, for this type of call list, the list identifies the best contact period for each account with respect to each optimization window. For example, the contact center may identify two optimization windows. The first window may run from 8:00 a.m. until 1:59 p.m. and the second window may run from 2:00 p.m. to 8:00 p.m. Thus, in this instance, the call list identifies a first contact period (e.g., best time to call) between 8:00 a.m. and 1:59 p.m. for each account in which a first call should be placed to the account and a second contact period (e.g., best time to call) between 2:00 p.m. and 8:00 p.m. for each account in which a second call should be placed to the account. Similar to the approach of having a call list that includes a sequential list for each contact period that includes each account, the contact center may check to determine whether an account should actually be called during the second contact period between 2:00 p.m. and 8:00 p.m.

Processing Call List Module

Figure 6:
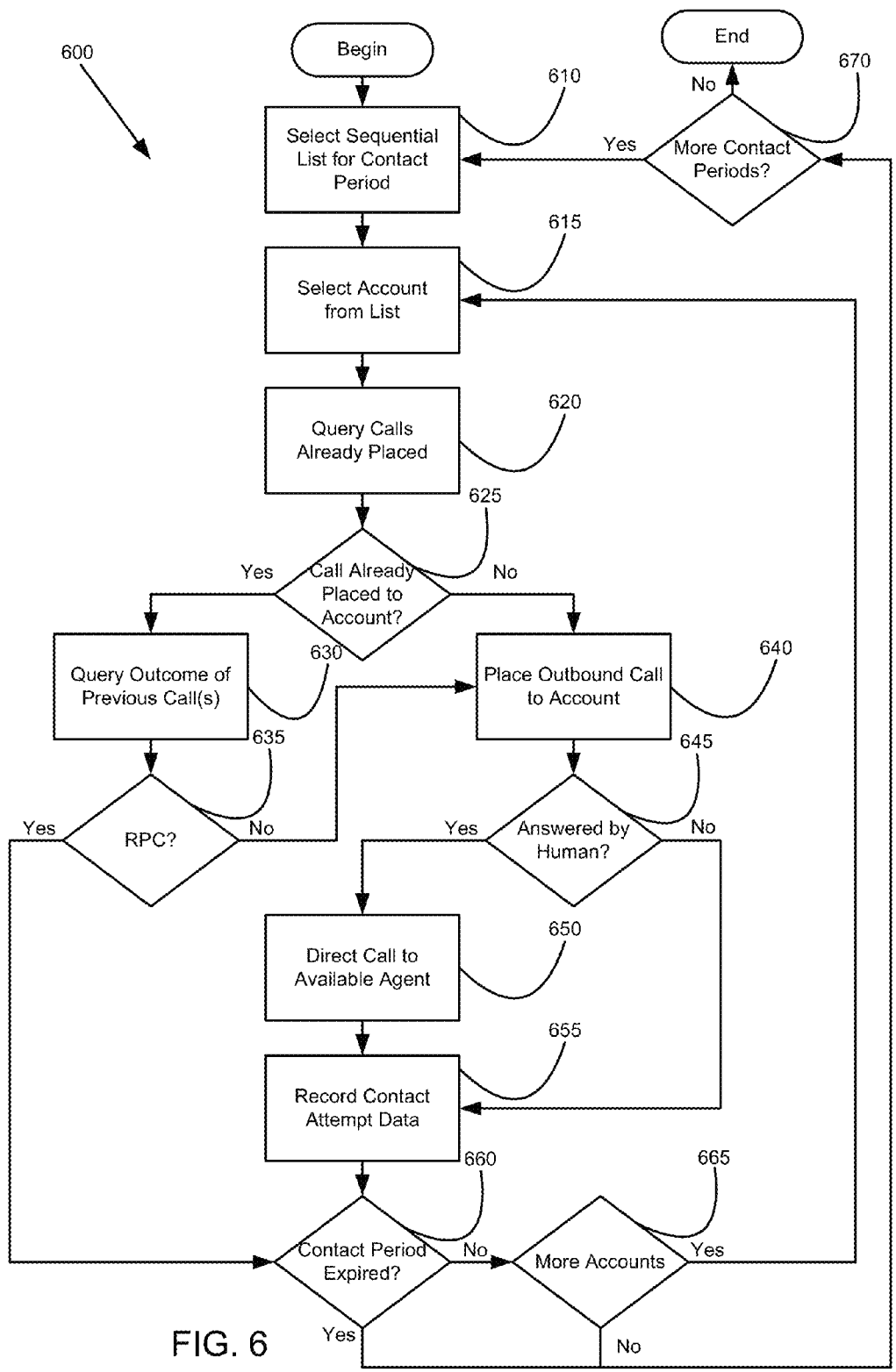
FIG. 6 illustrates a process flow for processing a call list according to various embodiments of the invention.

FIG. 6 provides a process flow for processing the call list and placing outbound calls for the accounts on the list according to various embodiments of the invention. Specifically, FIG. 6 provides a flow diagram showing a processing call list ("PCL") module for performing such functionality in according to various embodiments of the invention. Thus, the flow diagram shown in FIG. 6 may correspond to operations carried out by a processor of a component within the contact center architecture 100, such as a dialer 155, as it executes the PCL module stored in the component's volatile and/or non-volatile memory.

Before discussing the process 600 shown in FIG. 6, it is noted that in particular instances the contact center may segregate the accounts for any particular contact period according to the types of calls to be placed for the accounts. For instance, calls placed to wireless devices may need to be dialed manually so that such calls are compliant with federal regulations. Therefore, in these instances, the contact center may filter out the accounts from the various contact periods that are associated with cell phone numbers from the call list so that these calls can be placed manually by agents during these contact periods. While in other instances, these contacts may be filtered out as the call list is being processed by a dialer 155 (e.g., the PCL module). For example, as the dialer 155 may process the call list during a particular contact period and upon encountering an account associated with a wireless number, the dialer 155 may simply forward the information on the account to an available agent so that the agent can place the call to the account manually.

Turning now to FIG. 6, the process 600 for processing the call list begins with the PCL module selecting a sequential list from the call list for the appropriate contact period in Operation 610. As previously mentioned, the structure of the call list may vary according to different embodiments. However, in this instance, the call list provides a sequential list of accounts to attempt to contact for each contact period. Accordingly, at the beginning of the contact period, the PCL module selects the first account found in the sequential list in Operation 615.

At this point, the PCL module queries the calls already placed for the work day in Operation 620 and determines whether any calls have already been placed to the account during the work day in Operation 625. If so, then the PCL module queries the outcomes and/or results of the previously placed calls to the account in Operation 630. Thus, in particular embodiments, the outcome outcomes and result of each call are monitored and recorded as calls are placed for the accounts found on the call list for corresponding contact periods. Accordingly, in Operation 635, the PCL module determines whether a prior contact attempt to the particular account resulted in a RPC. It should be noted that in particular embodiments, the PCL module may also be configured to determine whether a particular result occurred for a previous RPC such as a promise-to-pay. If a RPC did occur for a previous call attempt, then the PCL module skips placing another call to the account. At this point, the PCL module determines whether the contact period has expired in Operation 660. If not, then the PCL module determines whether another account exists on the sequential list for the contact period in Operation 665. If so, then the PCL module returns to Operation 615 and selects the next account from the call list.

Returning to Operation 635, if instead the PCL module determines that none of the previous calls placed to the account during the work day resulted in a RPC, then the PCL module places an outbound call to the account in Operation 640. Accordingly, the PCL module places the call to the contact type identified for the account for the particular contact period. For instance, the account may identify numbers for a home phone, a work phone, and a cell phone. However, in this instance, the account may identify the work phone as the contact type to use to attempt to contact the account during the particular contact period. Further, in particular embodiments, the PCL module may first determine whether placing the call to the account using the contact type is "legal" before placing the call to the account. For example, the PCL module may first determine whether the number of allowable attempts to contact the account will not be exceeded by placing the call or whether the call will not be placed outside of an allowable calling window. Lastly, in particular embodiments, the PCL module may determine whether the contact type is a wireless device and if so, forward information on the account to an available agent so that the agent can manually place the call instead of the PCL module placing the call.

Once the call has been placed to the account, the PCL module monitors the call to determine whether the call has been answered by a human in Operation 645. If so, then the PCL module directs the call to an available agent in Operation 650. In particular instances, directing the call to an available agent may first involve placing the call into a queue until an agent becomes available.

At this point, the agent converses with the party on the call. In some instances, the party who has answered the call may not be the intended party to be contacted for the account (e.g., a WPC). While in other instances, the party who has answered the call is the intended party to be contacted for the account (e.g., a RPC). In addition, the result of reaching a RPC may or may not end in the desired result. For instance, for a particular RPC, the call may end with the contacted party making a promise-to-pay or not making a promise-to-pay.

Regardless of the outcome and/or result of the call, the PCL module receives one or more indications of the outcome and/or result of the call and records the indications as contact attempt data in Operation 655. For instance, a RPC may have been made for a particular call in which the contacted party agreed to submit a payment. Therefore, in this instance, the agent fielding the call may enter a code on his workstation indicating the contacted party has made a promise-to-pay. In turn, the PCL module may record the outcome and result of the call as a RPC+promise-to-pay as contact attempt data. As a result, if the same account appears on the call list for a later contact period in the work day, the PCL module will determine that the account has already been contacted and the desired result was obtained. Accordingly, the PCL module would then skip making a subsequent call to the account.

Once the contact attempt data has been recorded, the PCL module determines whether the current contact period has ended in Operation 660. If so, then the PCL module determines whether another contact period is to follow in Operation 670. If so, then the PCL module selects the sequential list for the next contact period in Operation 610 and processes the list accordingly. Returning to Operation 660, if current contact period has not expired then the PCL module determines whether the sequential list has more accounts in Operation 665. If so, then the PCL module selects the next account from the list in Operation 615 and processes the account accordingly. Once the PCL module has processed the sequential list for each contact period, the process 600 ends.

Exemplary Computer Processing Device

Figure 7:
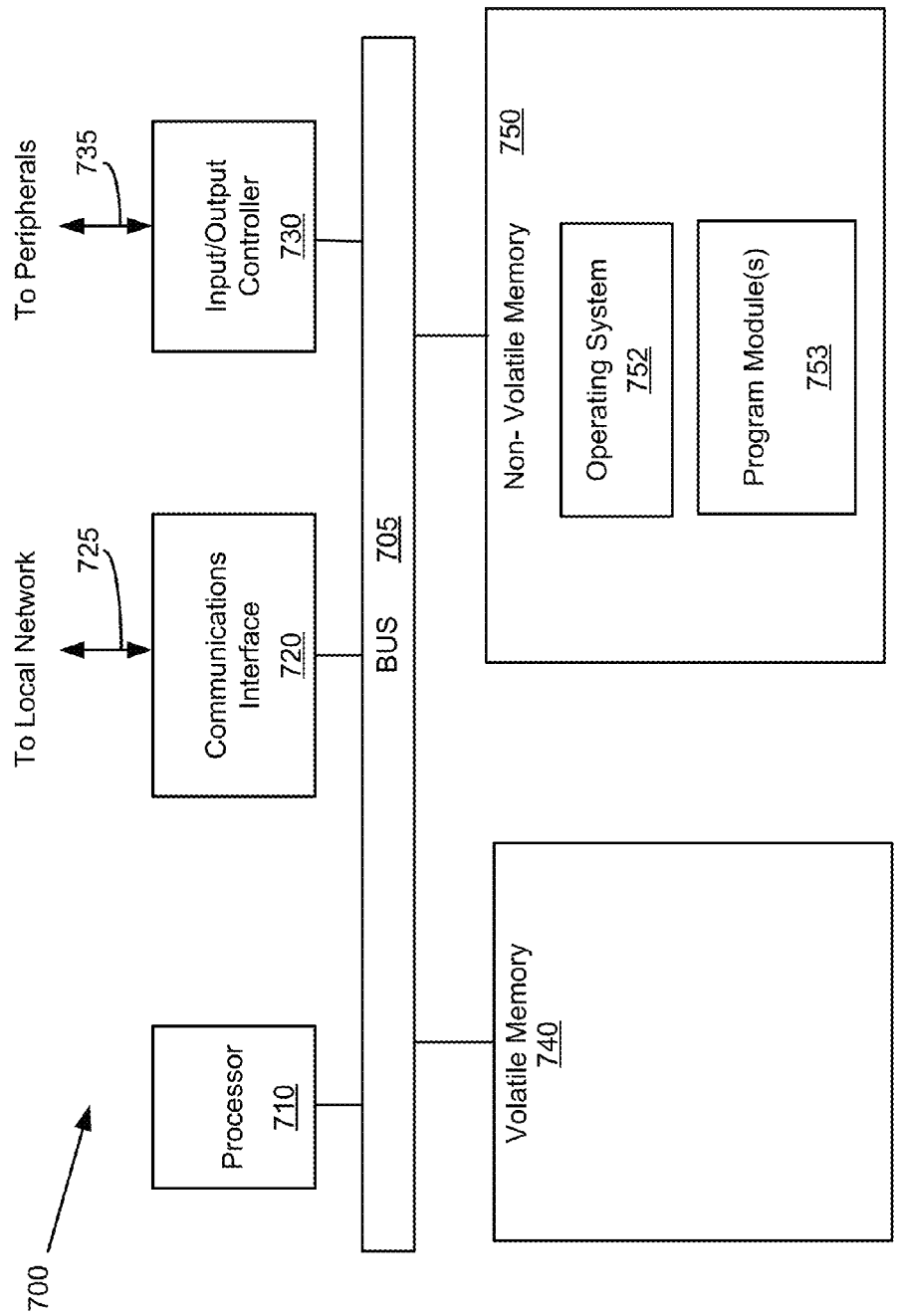
FIG. 7 illustrates one embodiment of a processing device used to practice the technologies disclosed herein.

FIG. 7 is an exemplary schematic diagram of a computer processing system that may be used in an embodiment of the contact center architecture 100 to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 7, the processing system 700 may include one or more processors 710 that may communicate with other elements within the processing system 700 via a bus 705. The processor 710 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 700 may also include one or more communications interfaces 720 for communicating data via the local network 170 with various external devices, including those shown in FIG. 1. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 730 may also communicate with one or more input devices or peripherals using an interface 735, such as, but not limited to: a keyboard, a mouse, a touch screen/display input, microphone, pointing device, etc. The input/output controller 730 may also communicate with output devices or peripherals, such as displays, printers, speakers, headsets, banner displays, etc. These may be used, in part, to receive Administrator input, including for interacting with the manual agent selection module.

The processor 710 may be configured to execute instructions stored in volatile memory 740, non-volatile memory 750, or other forms of computer readable storage media accessible to the processor 710. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 750 may store program code and data, which also may be loaded into the volatile memory 740 at execution time. Specifically, the non-volatile memory 750 may store one or more program modules 753 such as the HCADU module, the BTC module, and/or the PCL module that may perform the above-mentioned process flows and/or operating system code 752 containing instructions for performing the process and/or functions associated with the technologies disclosed herein. The these program modules 753 may also access, generate, or store information such as, for example, contact attempt data in the non-volatile memory 750, as well as in the volatile memory 740. The volatile memory 740 and/or non-volatile memory 750 may be used to store other information including, but not limited to: records, applications, programs, scripts, source code, object code, byte code, compiled code, interpreted code, machine code, executable instructions, or the like. These may be executed or processed by, for example, processor 710. These may form a part of, or may interact with, the program modules 753.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

Further, it is noted that the concepts and technologies set forth herein may be applied to parameters other than abandonment rates in particular embodiments. For example, particular embodiments of the invention may be applicable in processing call campaigns with respect to other multiple variables that may be defined for a campaign. For example, in collections environments, a contact center may be processing a call list for a particular campaign having telephone numbers with different limits with respect to the number of calls the contact center may attempt to try and contact parties associated with the telephone numbers for debt collection purposes. Thus, in this example, the call list may be apportioned into sub-lists based on the number of allowed attempts for the telephone numbers in each sub-list so that the contact center may process a particular sub-list more or less aggressively based on the applicable allowed attempts for the particular sub-list.

The invention claimed is:

1. A method for placing an outbound call to a party by using a dialer based on a best time to contact the party over a plurality of contact periods of time to achieve at least one of a desired outcome and a desired result, the method comprising the steps of:
   generating probabilities of achieving at least one of the desired outcome and the desired result by a computer processor with respect to the party, wherein:
      the party has a plurality of contact types that can be utilized to place the outbound call to the party,
      the probabilities for the party comprise a set of probabilities for each of the plurality of contact periods of time, and
      a set of probabilities for a particular contact period of time for the party comprises a probability for each contact type for the party of achieving at least one of the desired outcome and the desired result by utilizing the contact type to place the outbound call to the party during the particular contact period of time;
   selecting an optimal contact type for the party for each of the plurality of contact periods of time by the computer processor, wherein:
      the optimal contact type for a particular contact period of time for the party provides a probability from the set of probabilities generated for the particular contact period of time for the party with a highest likelihood of achieving at least one of the desired outcome and the desired result by utilizing the optimal contact type to place the outbound call to the party during the particular contact period of time;
   identifying the best time to contact the party as one of the plurality of contact periods of time based on the optimal contact types selected for the party for each of the plurality of contact periods of time and associated probabilities;
   generating a call list identifying parties to place outbound calls to during each of the plurality of contact periods of time, wherein the call list identifies placing the outbound call to the party during the best time to contact the party; and
   placing the outbound call by the dialer to the party during the best time to contact the party based on the call list, wherein the dialer places the outbound call utilizing the optimal contact type identified for the best time to contact the party.

2. The method of claim 1, wherein the plurality of contact periods of time comprise consecutive one hour segments of time.

3. The method of claim 1, wherein at least one of the desired outcome and the desired result comprises as least one of a right party contact and a promise-to-pay on a delinquent payment.

4. The method of claim 1, wherein identifying the best time to contact the party further comprises:
   determining what resources are available for each of the plurality of contact periods of time that can be used to place outbound calls;
   identifying costs of placing an outbound call with respect to achieving at least one of the desired outcome and the desired result;
   determining a relative contact priority value for the party, wherein the relative contact priority value for the party provides a measure of an importance of contacting the party with respect to the other parties;

generating a contact attempt value for the party for each of the plurality of contact periods of time based on the resources available for each of the plurality of contact periods of time, the costs of placing an outbound call, the probabilities associated with the optimal contact types selected for the party for each of the plurality of contact periods of time, and the relative contact priority value for the party; and identifying the best time to contact the party based on the contact attempt value generated for the party for each of the plurality of contact periods of time.

5. The method of claim 1, wherein placing the outbound call by the dialer to the party during the best time to contact the party based on the call list further comprises:

determining by the dialer whether the contact period of time associated with the best time to contact the party has expired;

upon determining the contact period of time associated with the best time to contact the party has not expired:

determining by the dialer whether placing the outbound call to the party is permitted during the contact period of time associated with the best time to contact the party; and upon determining placing the outbound call to the party is permitted:

placing the outbound call by the dialer to the party by utilizing the optimal contact type identified for the best time to contact the party;

monitoring the outbound call to determine whether the outbound call is answered; and upon determining the outbound call has been answered, directing the outbound call to an agent to handle.

6. A non-transitory, computer-readable medium comprising computer-executable instructions for placing an outbound call to a party by using a dialer based on a best time to contact the party over a plurality of contact periods of time to achieve at least one of a desired outcome and a desired result, the computer-executable instructions when executed by at least one computer processor cause the at least one computer processor to:

generate probabilities of achieving at least one of the desired outcome and the desired result with respect to the party, wherein:

the party has a plurality of contact types that can be utilized to place the outbound call to the party, the probabilities for the party comprise a set of probabilities for each of the plurality of contact periods of time, and a set of probabilities for a particular contact period of time for the party comprises a probability for each contact type for the party of achieving at least one of the desired outcome and the desired result by utilizing the contact type to place the outbound call to the party during the particular contact period of time;

select an optimal contact type for the party for each of the plurality of contact periods of time, wherein:

the optimal contact type for a particular contact period of time for the party provides a probability from the set of probabilities generated for the particular contact period of time for the party with a highest likelihood of achieving at least one of the desired outcome and the desired result by utilizing the optimal contact type to place the outbound call to the party during the particular contact period of time;

identify the best time to contact the party as one of the plurality of contact periods of time based on the optimal contact types selected for the party for each of the plurality of contact periods of time and associated probabilities; and generate a call list identifying parties to place outbound calls to during each of the plurality of contact periods of time, wherein the call list identifies placing the outbound call to the party during the best time to contact the party and the dialer places the outbound call to the party during the best time to contact the party based on the call list by utilizing the optimal contact type identified for the best time to contact the party.

7. The non-transitory, computer-readable medium of claim 6, wherein the plurality of contact periods of time comprise consecutive one hour segments of time.

8. The non-transitory, computer-readable medium of claim 6, wherein at least one of the desired outcome and the desired result comprises as least one of a right party contact and a promise-to-pay on a delinquent payment.

9. The non-transitory, computer-readable medium of claim 6, wherein the computer-executable instructions when executed by the at least one computer processor cause the at least one computer processor to identify the best time to contact the party by:

determining what resources are available for each of the plurality of contact periods of time that can be used to place outbound calls;

identifying costs of placing an outbound call with respect to achieving at least one of the desired outcome and the desired result;

determining a relative contact priority value for the party, wherein the relative contact priority value for the party provides a measure of an importance of contacting the party with respect to the other parties;

generating a contact attempt value for the party for each of the plurality of contact periods of time based on the resources available for each of the plurality of contact periods of time, the costs of placing an outbound call, the probabilities associated with the optimal contact types selected for the party for each of the plurality of contact periods of time, and the relative contact priority value for the party; and identifying the best time to contact the party based on the contact attempt value generated for the party for each of the plurality of contact periods of time.

10. The non-transitory, computer-readable medium of claim 6, wherein the at least one computer processor resides in the dialer.

11. The non-transitory, computer-readable medium of claim 10, wherein the computer-executable instructions when executed by the at least one computer processor cause the dialer to place the outbound call to the party during the best time to contact the party based on the call list by:

determining whether the contact period of time associated with the best time to contact the party has expired;

upon determining the contact period of time associated with the best time to contact the party has not expired:

determining whether placing the outbound call to the party is permitted during the contact period of time associated with the best time to contact the party; and upon determining placing the outbound call to the party is permitted:

causing the dialer to place the outbound call to the party by utilizing the optimal contact type identified for the best time to contact the party;

monitoring the outbound call to determine whether the outbound call is answered; and upon determining the outbound call has been answered, directing the outbound call to an agent to handle.

12. A system for placing an outbound call to a party based on a best time to contact the party over a plurality of contact periods of time to achieve at least one of a desired outcome and a desired result, the system comprising:

at least one computer processor configured to:

generate probabilities of achieving at least one of the desired outcome and the desired result with respect to the party, wherein:

the party has a plurality of contact types that can be utilized to place the outbound call to the party, the probabilities for the party comprise a set of probabilities for each of the plurality of contact periods of time, and a set of probabilities for a particular contact period of time for the party comprises a probability for each contact type for the party of achieving at least one of the desired outcome and the desired result by utilizing the contact type to place the outbound call to the party during the particular contact period of time;

select an optimal contact type for the party for each of the plurality of contact periods of time, wherein:

the optimal contact type for a particular contact period of time for the party provides a probability from the set of probabilities generated for the particular contact period of time for the party with a highest likelihood of achieving at least one of the desired outcome and the desired result by utilizing the optimal contact type to place the outbound call to the party during the particular contact period of time;

identify the best time to contact the party as one of the plurality of contact periods of time based on the optimal contact types selected for the party for each of the plurality of contact periods of time and associated probabilities; and generate a call list identifying parties to place outbound calls to during each of the plurality of contact periods of time, wherein the call list identifies placing the outbound call to the party during the best time to contact the party; and a dialer configured to:

place the outbound call to the party during the best time to contact the party based on the call list, wherein the dialer places the outbound call utilizing the optimal contact type identified for the best time to contact the party.

13. The system of claim 12, wherein the plurality of contact periods of time comprise consecutive one hour segments of time.

14. The system of claim 12, wherein at least one of the desired outcome and the desired result comprises as least one of a right party contact and a promise-to-pay on a delinquent payment.

15. The system of claim 12, wherein the at least one computer processor is configured to identify the best time to contact the party by:

determining what resources are available for each of the plurality of contact periods of time that can be used to place outbound calls;

identifying costs of placing an outbound call with respect to achieving at least one of the desired outcome and the desired result;

determining a relative contact priority value for the party, wherein the relative contact priority value for the party provides a measure of an importance of contacting the party with respect to the other parties;

generating a contact attempt value for the party for each of the plurality of contact periods of time based on the resources available for each of the plurality of contact periods of time, the costs of placing an outbound call, the probabilities associated with the optimal contact types selected for the party for each of the plurality of contact periods of time, and the relative contact priority value for the party; and identifying the best time to contact the party based on the contact attempt value generated for the party for each of the plurality of contact periods of time.

16. The system of claim 12, wherein the dialer is configured to place the outbound call to the party during the best time to contact the party based on the call list by:

determining whether the contact period of time associated with the best time to contact the party has expired;

upon determining the contact period of time associated with the best time to contact the party has not expired:

determining whether placing the outbound call to the party is permitted during the contact period of time associated with the best time to contact the party; and upon determining placing the outbound call to the party is permitted:

placing the outbound call to the party by utilizing the optimal contact type identified for the best time to contact the party;

monitoring the outbound call to determine whether the outbound call is answered; and upon determining the outbound call has been answered, directing the outbound call to an agent to handle.

* * * * *